3,125,567
6-AMINO-9-D-PSICOFURANOSYLPURINE DERIVATIVES AND PROCESS THEREFOR
William Schroeder, Pavilion Township, Kalamazoo County, Charles Lewis, Kalamazoo, Herman Hoeksema, Kalamazoo Township, Kalamazoo County, Thomas E. Eble, Kalamazoo, and Brian Bannister, Kalamazoo Township, Kalamazoo County, Mich., assignors to The Upjohn Company, Kalamazoo, Mich., a corporation of Delaware
No Drawing. Filed Jan. 26, 1959, Ser. No. 788,748
8 Claims. (Cl. 260—211.5)

This invention relates to a process and novel derivatives of 6-amino-9-D-psicofuranosylpurine produced thereby and is more particularly concerned with 3'- and 4'-acylates and 3',4'-diacylates of 6-amino-9-D-psicofuranosylpurine.

The novel compounds of the invention can, for the most part, be represented by the following general formula:

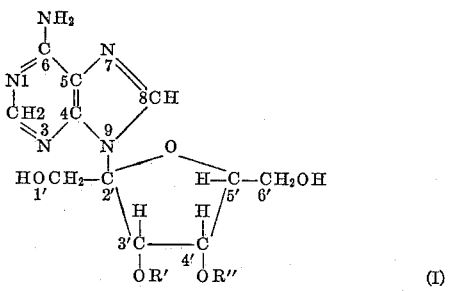

wherein R' and R'' are selected from the class consisting of hydrogen, a hydrocarbon carboxylic acid acyl group containing from 1 to 12 carbon atoms, inclusive, and a halo-, nitro-, hydroxy-, amino-, cyano-, thiocyano-, and lower-alkoxy-substituted hydrocarbon carboxylic acid acyl group containing from 1 to 12 carbon atoms, inclusive, and wherein R' and R'' do not represent hydrogen simultaneously.

The term "hydrocarbon carboxylic acid acyl radical containing from 1 to 12 carbon atoms," whenever used in the specification and claims, is intended to mean an acyl radical corresponding to a hydrocarbon carboxylic acid containing from 1 to 12 carbon atoms, inclusive. Such acids include (a) a saturated or unsaturated, straight or branched chain aliphatic carboxylic acid such as acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated cycloaliphatic carboxylic acid such as cyclobutane carboxylic, cyclopentane carboxylic, cyclopentene carboxylic, methylcyclopentene carboxylic, cyclohexane carboxylic, dimethylcyclohexene carboxylic acids, and the like; (c) a saturated or unsaturated cycloaliphatic-substituted aliphatic carboxylic acid such as cyclopentaneacetic, cyclopentanepropionic, cyclopenteneacetic, cyclohexanebutyric, and methylcyclohexaneacetic acids and the like; (d) an aromatic carboxylic acid such as benzoic, toluic, naphthoic, ethylbenzoic, isobutylbenzoic, methylbutylbenzoic acids, and the like; and (e) an aromatic-aliphatic carboxylic acid such as phenylacetic, phenylpropionic, phenylvaleric, naphthylacetic, cinnamic, phenylpropiolic acids, and the like.

The term "halo-, nitro-, hydroxy-, amino-, cyano-, thiocyano- and lower-alkoxy-substituted hydrocarbon carboxylic acid acyl group containing from 1 to 12 atoms, inclusive," is intended to mean an acyl radical corresponding to a hydrocarbon carboxylic acid, as hereinbefore defined, which acid is substituted by one or more halogen atoms, nitro, hydroxy, amino, cyano, thiocyano, and lower-alkoxy groups. By "lower-alkoxy" is meant an alkoxy group containing from 1 to 6 carbon atoms, inclusive, such as methoxy, ethoxy, propoxy, butoxy, amyloxy, hexyloxy and isomeric forms thereof. Examples of substituted hydrocarbon carboxylic acid acyl radicals falling within the above definition are the acyl radicals corresponding to chloroacetic, chloropropionic, bromobutyric, iodovaleric, chlorocyclohexanecarboxylic, chlorobenzoic, anisic, salicylic, nitrobenzoic, cyanacetic, cyanopropionic, thiocyanacetic, lactic acids, glycine, and the like.

The compounds of the invention are valuable intermediates in the preparation of pentaacylates and hexaacylates of 6-amino-9-D-psicofuranosylpurine, in which polyacylates the acyl groups in the 3' and/or 4' positions of the psicose moiety can be the same as or different from the acyl groups in the other positions in the molecule. Said pentaacylates and hexaacylates exhibit valuable pharmacological activity. Illustratively, 6-acetylamino-9-D-psicofuranosylpurine tetraacetate and the corresponding pentaacetate (i.e., 1-acetyl-6-acetylimino-1,6-dihydro-9-D-psicofuranosylpurine 1',3',4',6'-tetraacetate) exhibit in vivo activity against the organism S. haemolyticus.

The compound, 6-amino-9-D-psicofuranosylpurine, from which the compounds of the invention are derived, is an antibiotic and anti-tumor agent which can be obtained as an elaboration product of the organism Stretptomyces hygroscopicus var. NRRL 2666 as described in copending application Serial No. 720,066, filed March 10, 1958, now Patent Number 3,020,274.

It is an object of the invention to provide the novel compounds having the Formula I above. Other objects of the invention will be apparent to those skilled in the art.

The novel compounds of the invention having the Formula I above can be prepared from 6-amino-9-D-psicofuranosylpurine in the following manner. Treatment of 6-amino-9-D-psicofuranosylpurine with at least three molar proportions of a trityl (triphenylmethyl) halide, for example, trityl chloride or trityl bromide, in the presence of a tertiary amine yields 6-tritylamino-9-D-psicofuranosylpurine 1',6'-ditrityl ether. Suitable tertiary amines include pyridine, quinoline, isoquinoline, trialkylamines such as trimethylamine, triethylamine, tri-isopropylamine, and the like, N,N-dialkylanilines such as dimethylaniline, diethylaniline, and the like, and N-alkylpiperidines such as N-ethylpiperidine, N-methylpiperidine, and the like. The preferred amine is pyridine. The reaction is carried out advantageously by heating the mixture of reactants at a temperature of the order of 100° C. for several hours. The reaction product can be decomposed in a convenient manner by addition to ice water and the desired compound isolated therefrom by conventional procedures, for example, by extraction in a suitable solvent sucth as chloroform. The compound so obtained can be purified, if necessary, by procedures known in the art, for example, by chromatography.

The 6-tritylamino-9-D-psicofuranosylpurine 1',6'-ditrityl ether so obtained is then acylated using procedures known in the art for the acylation of secondary alcohol groups. Thus, the ditrityl ether can be treated, in the presence of a tertiary amine, with an acid halide or acid anhydride corresponding to a hydrocarbon or substituted-hydrocarbon carboxylic acid as hereinbefore defined. When equimolar proportions of ditrityl ether and the acid halide or anhydride are employed, there is obtained a mixture of the corresponding 3'-monoacylate and 4'-monoacylate of 6-tritylamino-9-D-psicofuranosylpurine 1',6'-ditrityl ether. Said mixture can be separated into its component parts by conventional procedures, for example, by fractional crystallization or by countercurrent distribution in a suitable solvent system. The 3'-monoacylate and 4'-monoacylate so obtained can then be acylated further, if desired, using the procedure described above and employing an acid halide or anhydride which can be identical to or different from the acylating agent used to prepare the monoacylates so that there is produced the corresponding 6-tritylamino-9-D-psicofuranosylpurine 3',4'-diacylate 1',6'-ditrityl ether in which the acyl groups in the 3'- and 4'-positions are the same or different.

When the amount of acid halide or acid anhydride used in the acylation of 6-tritylamino-9-D-psicofuranosylpurine 1',6'-ditrityl ether is at least 2 molar proportions per mole of ditrityl ether there is produced the corresponding 6-tritylamino-9-D-psicofuranosylpurine 3',4'-diacylate 1',6'-ditrityl ether. The latter compound can be isolated from the reaction mixture by conventional procedures, for example, by decomposing the reaction mixture with water, extracting the desired product in a suitable solvent such as chloroform and isolating therefrom by evaporation. The diacylate so obtained can be purified by conventional procedures, for example, by crystallization.

The 3'-monoacylates, 4'-monoacylates and 3',4'-diacylates of 6-tritylamino-9-D-psicofuranosylpurine 1',6'-ditrityl ether so obtained are then treated to remove the trityl groups. This can be accomplished in a suitable manner by subjecting the compounds to hydrogenolysis in the presence of a catalyst such as palladium-on-charcoal. The hydrogenolysis is preferably conducted in the presence of a solvent such as a lower alkanol, for example, methanol, ethanol, isopropanol, and the like, and a lower alkyl ester of a lower aliphatic hydrocarbon carboxylic acid such as ethyl acetate, methyl propionate, methyl isobutyrate, and the like. The desired compound of the Formula I above can be isolated from the reaction mixture in a convenient manner by removing the catalyst by filtration and evaporating the filtrate to dryness. The compound so isolated is contaminated with triphenylmethane produced in the hydrogenolysis and can be separated therefrom by conventional procedures, for example, by chromatography or by countercurrent distribution in a suitable solvent system.

It is to be noted that where the acylating agent, employed in the acylation of the above ditrityl ether, is derived from an acid which contains a group or groups capable of being reduced by catalytic hydrogenation, such groups will be so reduced during the hydrogenolysis of the trityl ether acylates to remove the trityl groups. Acids, the acyl radicals of which will be reduced under such conditions, include acrylic, crotonic, hexynoic, heptynoic, octynoic, cyclopentene carboxylic, methylcyclopentene carboxylic, cinnamic, phenylpropiolic, nitrobenzoic acids, and the like.

The compounds of the invention having the Formula I above can be acylated further using the procedures hereinbefore defined. By employing the appropriate proportions of acylating agent and compound having the Formula I above it is possible to obtain pentaacylates and hexaacylates of 6-amino-9-D-psicofuranosylpurine. Thus, by reacting the 3'-monoacylates and 4'-monoacylates of the invention with at least 5 molar proportions of acid anhydride or acid halide, or by reacting the 3',4'-diacylates of the invention with at least 4 molar proportions of acid anhydride or acid halide, there are obtained the corresponding hexaacylates. It is to be noted that the acylating agents employed in such processes may be identical to or different from the acylating agents used in the preparation of the monoacylates and diacylates of the invention. Hence, the acyl groups on the 3'- and/or 4'-hydroxyl groups in the resulting hexaacylates may be the same as or different from those in the other acylated centers.

It will be appreciated that the above-mentioned hexaacylates are derived from the "imino" form of 6-amino-9-D-psicofuranosylpurine and having the following structure

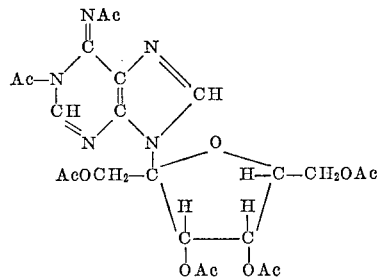

wherein Ac represents the appropriate acyl radical. These hexaacylates are more correctly described as 1-acyl-6-acylimino-1,6-dihydro-9-D-psicofuranosylpurine 1',3',4', 6'-tetraacylates.

Similarly, by treating the monoacylates and diacylates of the invention with an equimolar proportion of acid anhydride or acid halide using the reaction conditions described previously there can be obtained a mixture of diacylates (in the case of monoacylate starting materials) or triacylates (in the case of diacylate starting materials) in which the acyl groups on the 3'- and/or 4'-hydroxyl groups may be the same as or different from the acyl groups in the other acylated centers. Said mixtures of acylates can be separated into their component parts by conventional procedures, for example, by countercurrent distribution in a suitable solvent system.

Likewise, by treating the monoacylates and diacylates of the invention with different proportions of acid anhydride or acid halide within the range of greater than equimolar but less than 5 moles per mole of monoacylate or 4 moles per mole of diacylate, there can be obtained mixtures of triacylates, tetraacylates and pentaacylates which can be separated into their component parts by the means described above.

The following examples are illustrative of the process and products of the present invention, but are not to be construed as limiting.

EXAMPLE 1

*6-Tritylamino-9-D-Psicofuranosylpurine 1',6'-Ditrityl Ether*

A solution of 3.81 g. (0.0128 mole) of 6-amino-9-D-psicofuranosylpurine (previously dried at 60° C. at a pressure of 0.01 mm. of mercury for 12 hours) in 180 ml. of anhydrous pyridine was treated with 13.8 g. (0.0422 mole) of trityl bromide. The mixture was heated on a steam bath for 3 hours and then allowed to stand overnight at room temperature. The resulting solution was treated with 25 ml. of ice-water and the mixture was allowed to stand at room temperature for 1 hour before removing the solvents as completely as possible in a rotating evaporator at a temperature of 20° C. and a pressure of less than 1 mm. of mercury. The residue was dissolved in chloroform and the chloroform solution was washed 3 times with water before being dried over anhydrous sodium sulfate. The dried solution was filtered and the filtrate evaporated to dryness in a rotating evaporator at a temperature of 30° C. and a pressure of 15 mm. of mercury. The oily residue (16.9 g.) was dissolved by warming in 90 ml. of benzene and the solution was cooled. The crystalline material which separated was collected by filtration, washed with benzene and dried; this material weighed 0.896 g. and had a melting point of 242 to 244° C. after darkening at 238 to 240° C. The filtrate was evaporated to dryness in a rotating evaporator at a temperature of 30° C. and a pressure of 15 mm. of mercury. The oily residue (16.0 g) was dissolved in benzene and subjected to chromatography on a column of 500 g. of magnesium silicate (Florisil), the desired product being eluted with 6 l. of a mixture of equal parts of ethyl acetate and benzene. The eluate was evaporated to dryness and the residue was recrystallized twice from benzene. There was thus obtained 6-tritylamino-9-D-psicofuranosylpurine 1',6'-ditrityl ether in the form of a crystalline solid having a melting point of 250 to 250.5° C. after darkening slightly at 248 to 250° C. The ultraviolet absorption spectrum of the compound in solution in 95% ethanol exhibited a maximum at 275 millimicrons ($a$=20.87; $a_M$=21,380) with shoulders at 268 millimicrons ($a$=20.07; $a_M$=20,550) and 284 millimicrons ($a$=14.76; $a_M$=15,110). The infrared absorption spectrum of the compound (mineral oil mull) exhibited maxima at 3340 (shoulder), 3280, 3120 (shoulder), 1792, 1604, 1583, 1520, 1495, 1140, 1110, 1085 (shoulder), 1072, 1030 (shoulder), 1025, 1000, 780, 770 (shoulder), 763, 740, 708, and 690 reciprocal centimeters.

Analysis.—Calcd. for $C_{68}H_{57}O_5N_5$: C, 79.76; H, 5.58; N, 6.84. Found: C, 79.57; H, 5.25; N, 6.81.

EXAMPLE 2

*6-Amino-9-D-Psicofuranosylpurine 3',4'-Diacetate*

(A) 6-TRITYLAMINO-9-D-PSICOFURANOSYLPURINE 3',4'-DIACETATE 1',6'-DITRITYL ETHER

A suspension of 5.12 g. (0.005 mole) of 6-tritylamino-9-D-psicofuranosylpurine 1',6'-ditrityl ether (prepared as described in Example 1) in 50 ml. of anhydrous pyridine was treated slowly with stirring with 5 ml. (0.0537 mole) of acetic anhydride, the temperature being maintained at 15 to 18° C. by cooling when necessary. The mixture so obtained was allowed to stand for 5 days at the laboratory temperature (approximately 20° C.) and was then treated with 20 g. of ice and stirred with cooling for 3 hours. The resulting mixture was evaporated to dryness under reduced pressure and the residue was dissolved in chloroform. The chloroform solution was washed with water and then with 3 N sulfuric acid before being dried over anhydrous sodium sulfate. The dried solution was filtered and the filtrate evaporated to dryness. There was thus obtained 6-tritylamino-9-D-psicofuranosylpurine 3',4'-diacetate 1',6'-ditrityl ether.

In a similar manner, but replacing acetic anhydride by benzoyl chloride, propionyl chloride, isobutyryl chloride, valeryl chloride, isovaleryl chloride, tert.-butylacetyl chloride, caproyl chloride, heptanoyl chloride, phenylacetyl chloride, toluoyl chloride, cyclopentylpropionyl chloride, cyclopentenylpropionyl chloride, cyclohexylacetyl chloride, acrylyl chloride, crotonyl chloride, hex-2-yn-1-oyl chloride, oct-2-yn-1-oyl chloride, chloroacetyl bromide, p-chlorobenzoyl chloride, anisoyl chloride, salicyloyl bromide, p-nitrobenzoyl chloride and cyanoacetyl chloride, there are obtained the 3',4'-dibenzoate, 3',4'-dipropionate, 3',4'-diisobutyrate, 3',4'-divalerate, 3',4'-diisovalerate, 3', 4'-di-tert.-butylacetate, 3',4'-dicaproate, 3',4'-diheptanoate, 3',4'-di(phenylacetate), 3',4'-ditoluate, 3',4'-dicyclopentylpropionate, 3',4'-dicyclopentenylpropionate, 3',4'-di(cyclohexylacetate), 3',4'-diacrylate, 3',4'-dicrotonate, 3',4'-dihex-2-yn-1-oate, 3',4'-dioct-2-yn-1-oate, 3',4'-di(chloroacetate), 3',4'-di-p-chlorobenzoate, 3',4'-dianisate, 3',4'-disalicylate, 3',4'-di-p-nitrobenzoate, and 3',4'-di(cyanoacetate) of 6-tritylamino-9-D-psicofuranosylpurine 1',6'-ditrityl ether.

(B) 6-AMINO-9-D-PSICOFURANOSYLPURINE 3',4'-DIACETATE

A solution of 3 g. of 6-tritylamino-9-D-psicofuranosylpurine 3',4'-diacetate 1',6'-ditrityl ether in 100 ml. of ethanol was shaken with 2 g. of a 10% palladium-on-charcoal catalyst for 4 hours at room temperature (approximately 20° C.) in the presence of hydrogen at an initial pressure of 50 p.s.i.g. The resulting mixture was filtered and the filtrate was evaporated to dryness under reduced pressure. The residue was dissolved in 50 ml. of Skellysolve B (a technical mixture of hexanes) and subjected to chromatography on a column of 500 g. of magnesium silicate (Florisil). The column was eluted with 3 l. of Skellysolve B and the eluate (containing triphenylmethane) was discarded. The column was then eluted with 5 l. of a mixture of equal parts of benzene and ethyl acetate and the eluate was evaporated to dryness. There was thus obtained 6-amino-9-D-psicofuranosylpurine 3',4'-diacetate.

In a similar manner, by hydrogenolysis of the 3',4'-dibenzoate, 3',4'-dipropionate, 3',4'-diisobutyrate, 3',4'-divalerate, 3',4'-diisovalerate, 3',4'-di-tert.-butylacetate, 3',4'-dicaproate, 3',4'-diheptanoate, 3',4'-di(phenylacetate), 3',4'-ditoluate, 3',4'-dicyclopentylpropionate, 3',4'-di(cyclohexylacetate), 3',4'-di(chloroacetate), 3',4'-di-p-chlorobenzoate, 3',4'-dianisate, 3',4'-disalicylate, and 3',4'-di(cyanoacetate) of 6-tritylamino-9-D-psicofuranosylpurine 1',6'-ditrityl ether, there are obtained the 3',4'-dibenzoate, 3',4'-dipropionate, 3',4'-diisobutyrate, 3',4'-divalerate, 3',4'-diisovalerate, 3',4'-di-tert.-butylacetate, 3', 4'-dicaproate, 3',4'-diheptanoate, 3',4'-di(phenylacetate), 3',4'-ditoluate, 3',4'-dicyclopentylpropionate, 3',4'-di(cyclohexylacetate), 3',4'-di(chloroacetate), 3',4'-di-p-chlorobenzoate, 3',4'-dianisate, 3',4'-disalicylate, and 3',4'-di(cyanoacetate) of 6-amino-9-D-psicofuranosylpurine.

EXAMPLE 3

*6-Amino-9-D-Psicofuranosylpurine 3'-Benzoate and 6-Amino-9-D-Psicofuranosylpurine 4'-Benzoate*

A suspension of 10.23 g. (0.01 mole) of 6-tritylamino-9-D-psicofuranosylpurine 1',6'-ditrityl ether in 150 ml. of anhydrous pyridine was well stirred while 1.4 g. (0.01 mole) of benzoyl chloride was added slowly. The mixture was stirred for 45 minutes at room temperature (approximately 20° C.) and was then heated for 10 minutes on the steam bath. The reaction mixture was cooled and poured into 300 ml. of ice-water. The resulting mixture was extracted with chloroform and the chloroform solution was washed with water, and with 3 N sulfuric acid before being dried over anhydrous sodium sulfate. The dried solution was filtered and the filtrate was evaporated to dryness. There was thus obtained a mixture of the 3'-benzoate and 4'-benzoate of 6-tritylamino-9-D-psicofuranosylpurine 1',6'-ditrityl ether.

The mixture of benzoates so obtained was then subjected to hydrogenolysis as described in Example 2(B) to give a mixture of the 3'-benzoate and 4'-benzoate of 6-amino-9-D-psicofuranosylpurine. The latter mixture was then subjected to countercurrent distribution in a Craig apparatus using a solvent system of water: ethanol: ethylacetate: cyclohexane in the approximate ratio by volume of 15: 30: 15: 40, and was thereby separated to yield 6-amino-9-D-psicofuranosylpurine 3'-benzoate and 6-amino-9-D-psicofuranosylpurine 4'-benzoate.

In a similar manner, but replacing benzoyl chloride by acetic anhydride, there are obtained 6-amino-9-D-psicofuranosylpurine 3'-acetate and 6-amino-9-D-psicofuranosylpurine 4'-acetate.

EXAMPLE 4

*6-Amino-9-D-Psicofuranosylpurine 3'-Benzoate 4'-Acetate*

A suspension of 5.6 g. (0.0055 mole) of 6-tritylamino-9-D-psicofuranosylpurine 3'-benzoate 1',6'-ditrityl ether (prepared as described in Example 3) in 50 ml. of anhydrous pyridine was treated slowly with stirring with 5 ml. (0.054 mole) of acetic anhydride, the temperature being maintained at 15 to 18° C. by cooling when necessary. The mixture so obtained was allowed to stand for 5 days at the laboratory temperature (approximately 20° C.) and was then treated with 20 g. of ice and stirred with cooling for 3 hours. The resulting mixture was evaporated to dryness under reduced pressure and the residue was dissolved in chloroform. The chloroform solution was washed with water and then with 3 N sulfuric acid before being dried over anhydrous sodium sulfate. The dried solution was filtered and the filtrate evaporated to dryness. There was thus obtained 6-tritylamino-9-D-psicofuranosyl 3'-benzoate 4'-acetate 1',6'-ditrityl ether. The latter compound was then subjected to hydrogenolysis using the procedure described in Example 2(B). There was thus obtained 6-amino-9-D-psicofuranosylpurine 3'-benzoate 4'-acetate.

In a similar manner, but substituting 6-tritylamino-9-D-psicofuranosylpurine 4'-benzoate 1',6'-ditrityl ether for 6-tritylamino-9-D-psicofuranosylpurine 3'-benzoate 1',6'-ditrityl ether, there was obtained 6-amino-9-D-psicofuranosylpurine 3'-acetate 4'-benzoate.

EXAMPLE 5

*1-Benzoyl-6-Benzoylimino-1,6-Dihydro-9-D-Psicofuranosylpurine 1',3',4',6'-Tetrabenzoate*

A suspension of 4.01 g. (0.01 mole) of 6-amino-9-D-psicofuranosylpurine 3'-monobenzoate in 40 ml. of anhydrous pyridine was well stirred while 10 g. (0.071 mole) of benzoyl chloride was added dropwise over a period of 1 to 2 minutes. The mixture was stirred for 45 minutes after returning to room temperature and was then heated for 10 minutes on the steam bath. The reaction mixture was cooled and poured into 300 ml. of water. The oil which separated was washed with several portions of hot water and was then dissolved in 175 ml. of hot ethanol. The alcoholic solution was allowed to cool to room temperature and, after standing for 3 hours at this temperature, the solid which had crystallized was isolated by filtration. The material so obtained was recrystallized from 95% ethanol. There was thus obtained 1 - benzoyl-6-benzoylimino - 1,6 - dihydro-9-D-psicofuranosylpurine 1',3',4',6'-tetrabenzoate in the form of a crystalline solid having a melting point of 157 to 159° C.

*Analysis.*—Calcd. for $C_{53}H_{39}O_{11}N_5$: C, 69.05; H, 4.26; N, 7.60. Found: C, 68.79; H, 4.50; N, 8.03.

In a similar manner, but replacing benzoyl chloride by p-chlorobenzoyl chloride, acetic anhydride and butyryl chloride there are obtained 1-p-chlorobenzoyl-6-p-chlorobenzoylimino - 1,6 - dihydro-9-D-psicofuranosylpurine 3'-benzoate 1',4',6'-tri-p-chlorobenzoate, 1-acetyl-6-acetylimino-1,6-dihydro-9-D-psicofuranosylpurine 3' - benzoate 1',4',6'-triacetate, and 1-butyryl-6-butyrylimino-1,6-dihydro-9-D-psicofuranosylpurine 3'-benzoate 1',4',6'-tributyrate, respectively.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 6-amino-9-D-psicofuranosylpurine 3'-monoacylate wherein the acyl group is selected from the class consisting of a hydrocarbon carboxylic acid acyl group containing from one to twelve carbon atoms, inclusive, and a halo-, nitro-, hydroxy-, amino-, cyano-, thiocyano-, and lower-alkoxy-substituted hydrocarbon carboxylic acid acyl group containing from one to twelve carbon atoms, inclusive.

2. A 6-amino-9-D-psicofuranosylpurine 4'-monoacylate wherein the acyl group is selected from the class consisting of a hydrocarbon carboxylic acid acyl group containing from one to twelve carbon atoms, inclusive, and a halo-, nitro-, hydroxy-, amino-, cyano-, thiocyano-, and lower-alkoxy-substituted hydrocarbon carboxylic acid acyl group containing from one to twelve carbon atoms, inclusive.

3. A compound having the formula:

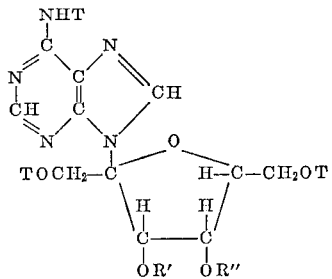

wherein T is a trityl group, R' and R" are selected from the class consisting of hydrogen, a hydrocarbon carboxylic acid acyl group containing from one to twelve carbon atoms, inclusive, and a halo-, nitro-, hydroxy-, amino-, cyano-, thiocyano-, and lower-alkoxy-substituted hydrocarbon carboxylic acid acyl group containing from one to twelve carbon atoms, inclusive, and wherein R' and R" do not represent hydrogen simultaneously.

4. A 6-tritylamino-9-D-psicofuranosylpurine 1',6'-ditrityl ether 3'-monoacylate wherein the acyl group is selected from the class consisting of a hydrocarbon carboxylic acid acyl group containing from one to twelve carbon atoms, inclusive, and a halo-, nitro-, hydroxy-, amino-, cyano-, thiocyano-, and lower-alkoxy-substituted hydrocarbon carboxylic acid acyl group containing from one to twelve carbon atoms, inclusive.

5. A 6-tritylamino-9-D-psicofuranosylpurine 1',6'-ditrityl ether 4'-monoacylate wherein the acyl group is selected from the class consisting of a hydrocarbon carboxylic acid acyl group containing from one to twelve carbon atoms, inclusive, and a halo-, nitro-, hydroxy-, amino-, cyano-, thiocyano-, and lower-alkoxy-substituted hydrocarbon carboxylic acid acyl group containing from one to twelve carbon atoms, inclusive.

6. A process which comprises catalytically hydrogenating a compound having the formula:

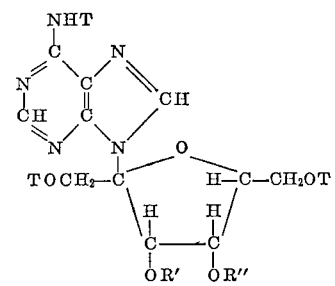

wherein T is a trityl group, R' and R" are selected from the class consisting of hydrogen, a hydrocarbon carboxylic acid acyl group containing from one to twelve carbon atoms, inclusive, and a halo-, nitro-, hydroxy-, amino-, cyano-, thiocyano-, and lower-alkoxy-substituted hydrocarbon carboxylic acid acyl group containing from one to twelve carbon atoms, inclusive, and wherein R' and R" do not represent hydrogen simultaneously, wherein the trityl groups T are replaced by hydrogen.

7. A process which comprises treating 6-amino-9-D-psicofuranosylpurine with a trityl halide in the presence of a tertiary amine, treating the resulting trityl ether with an acylating agent selected from the class consisting of the halides and anhydrides of hydrocarbon carboxylic acids containing from 1 to 12 carbon atoms, inclusive, and halo-, nitro-, hydroxy-, amino-, cyano-, thiocyano-, and lower-alkoxy-substituted hydrocarbon carboxylic acids containing from 1 to 12 carbon atoms, inclusive, and subjecting the acylated trityl ether so obtained to hydrogenolysis to remove the trityl groups.

8. A process which comprises reacting 6-amino-9-D-psicofuranosylpurine with a trityl halide in the presence of a tertiary amine and reacting the trityl ether so obtained with an acylating agent selected from the class consisting of the halides and anhydrides of hydrocarbon carboxylic acids containing from 1 to 12 carbon atoms, inclusive, and halo-, nitro-, hydroxy-, amino-, cyano-, thiocyano-, and lower-alkoxy-substituted hydrocarbon carboxylic acids containing from 1 to 12 carbon atoms, inclusive.

References Cited in the file of this patent

Yuntsen et al.: Japan Journal of Antibiotics, Series A, December 1956, pp. 195–201.

Yuntsen: Jr. of Antibiotics (Japan), November 1958, pp. 244–249.